(12) United States Patent
Su et al.

(10) Patent No.: US 11,042,782 B2
(45) Date of Patent: Jun. 22, 2021

(54) TOPIC-GUIDED MODEL FOR IMAGE CAPTIONING SYSTEM

(71) Applicant: INTEL CORPORATION, Santa Clara, CA (US)

(72) Inventors: Zhou Su, Beijing (CN); Jianguo Li, Beijing (CN); Anbang Yao, Beijing (CN); Yurong Chen, Beijing (CN)

(73) Assignee: INTEL CORPORATION, Santa Clara, CA (US)

( * ) Notice: Subject to any disclaimer, the term of this patent is extended or adjusted under 35 U.S.C. 154(b) by 79 days.

(21) Appl. No.: 16/473,898

(22) PCT Filed: Mar. 20, 2017

(86) PCT No.: PCT/CN2017/077280
§ 371 (c)(1),
(2) Date: Jun. 26, 2019

(87) PCT Pub. No.: WO2018/170671
PCT Pub. Date: Sep. 27, 2018

(65) Prior Publication Data
US 2019/0340469 A1    Nov. 7, 2019

(51) Int. Cl.
| | | |
|---|---|---|
| G06K 9/00 | (2006.01) |
| G06K 9/62 | (2006.01) |
| G06T 11/60 | (2006.01) |
| G06N 3/08 | (2006.01) |
| G06K 9/72 | (2006.01) |

(52) U.S. Cl.
CPC ......... *G06K 9/6262* (2013.01); *G06K 9/6256* (2013.01); *G06K 9/726* (2013.01); *G06N 3/08* (2013.01); *G06T 11/60* (2013.01)

(58) Field of Classification Search
CPC .... G06K 9/6262; G06K 9/6256; G06K 9/726; G06K 9/00671; G06K 9/00718;
(Continued)

(56) References Cited

U.S. PATENT DOCUMENTS 9,830,709 B2 * 11/2017 Li ............................. G06T 7/11
10,198,671 B1 * 2/2019 Yang ..................... G06K 9/3233
(Continued)

FOREIGN PATENT DOCUMENTS

| CN | 106503055 | 3/2017 |
| WO | 2018170671 | 9/2018 |

OTHER PUBLICATIONS

International Preliminary Report on Patentability and Written Opinion of the International Searching Authority dated Oct. 3, 2019 for International Patent Application No. PCT/CN2017/077280, 5 pages.
(Continued)

*Primary Examiner* — Jose L Couso
(74) *Attorney, Agent, or Firm* — Hanley, Flight & Zimmerman

(57) ABSTRACT

Techniques are provided for training and operation of a topic-guided image captioning system. A methodology implementing the techniques according to an embodiment includes generating image feature vectors, for an image to be captioned, based on application of a convolutional neural network (CNN) to the image. The method further includes generating the caption based on application of a recurrent neural network (RNN) to the image feature vectors. The RNN is configured as a long short-term memory (LSTM) RNN. The method further includes training the LSTM RNN with training images and associated training captions. The training is based on a combination of: feature vectors of the training image; feature vectors of the associated training caption; and a multimodal compact bilinear (MCB) pooling of the training caption feature vectors and an estimated topic of the training image. The estimated topic is generated by an application of the CNN to the training image.

22 Claims, 9 Drawing Sheets

(58) Field of Classification Search
CPC .......... G06K 9/00751; G06K 9/00711; G06K 9/6232; G06K 9/6274; G06K 9/00624; G06K 9/00684; G06K 9/3233; G06K 9/46; G06K 9/4628; G06K 9/6215; G06K 9/6264; G06K 9/627; G06K 9/6273; G06K 9/6276; G06K 9/72; G06K 9/6269; G06K 9/6267; G06K 9/66; G06K 9/3241; G06K 2209/27; G06K 2209/4666; G06N 3/08; G06N 3/0445; G06N 3/0454; G06N 3/0481; G06N 3/084; G06N 3/02; G06N 3/006; G06N 3/04; G06N 3/0427; G06N 20/00; G06N 5/04; G06N 5/046; G06N 5/047; G06T 11/60; G06T 7/11; G06T 7/97; G06T 7/0081; G06T 2207/20084; G06T 2207/30196; G06T 2210/12; G06F 16/51; G06F 16/583; G06F 16/24578; G06F 16/532; G06F 16/55; G06F 16/56; G06F 16/58; G06F 16/5838; G06F 16/908; G06F 16/5866; G06F 16/9536; G06F 16/958; G06F 16/383; G06F 17/30; G06F 40/205; G06F 40/279; G06F 40/30; G06F 40/56; G06F 40/211; G06Q 30/02; G06Q 30/0276; G06Q 30/0641; G06Q 50/01; G10L 15/18; G10L 21/055; G10L 25/30; H04N 5/23219; H04N 21/44008; H04N 2201/3225
See application file for complete search history.

(56) References Cited

U.S. PATENT DOCUMENTS

| 10,467,274 | B1* | 11/2019 | Ren | G06K 9/4604 |
|---|---|---|---|---|
| 2017/0098153 | A1* | 4/2017 | Mao | G06N 3/0454 |
| 2017/0132526 | A1* | 5/2017 | Cohen | G06N 3/0454 |
| 2017/0147910 | A1* | 5/2017 | Mao | G06N 3/0445 |
| 2017/0200065 | A1* | 7/2017 | Wang | G06K 9/4628 |
| 2018/0143966 | A1* | 5/2018 | Lu | G06K 9/4628 |
| 2018/0260698 | A1* | 9/2018 | Lin | G06F 16/5866 |

OTHER PUBLICATIONS

Chen, X. and C.L. Zitnick, "Learning a Recurrent Visual Representation for Image Caption Generation", arXiv:1411.5654v1; Nov. 20, 2014, 10 pages.

Denkowski, M. and A. Lavie, "Meteor Universal: Language Specific Translation Evaluation for Any Target Language", EACL, 2014, 5 pages.

Fang, H. et al., "From Captions to Visual Concepts and Back", arXiv:1411.4952v3, Apr. 14, 2015, 10 pages.

Fukui, A. et al., "Multimodal Compact Bilinear Pooling for Visual Question Answering and Visual Grounding", arXiv:1606.01847v3, Sep. 24, 2016, 12 pages.

Gao, Y. et al., "Compact Bilinear Pooling", arXiv:1511.06062v2, Apr. 12, 2016, 10 pages.

Karpathy, A. and L. Fei-Fei, "Deep Visual-Semantic Alignments for Generating Image Descriptions", CVPR, 2015, 17 pages.

Kiros, R. et al., "Unifying Visual-Semantic Embeddings with Multimodal Neural Language Models", arXiv:1411.2539v1, Nov. 10, 2014, 13 pages.

Lin, T. et al., "Microsoft COCO: Common Objects in Context", arXiv:1504.00325v3, Feb. 21, 2015, 15 pages.

Mao, J. et al., "Deep Captioning with Multimodal Recurrent Neural Networks", arXiv:1412.6632v5, Jun. 11, 2015, 17 pages.

Papineni, K. et al., "BLEU: a method for automatic evaluation of machine translation", Proceedings of the 40th Annual Meeting of the Association for Computational Linguistics (ACL), Jul. 2002, pp. 311-318.

Simonyan K. and A. Zisserman, "Very Deep Convolutional Networks for Large-Scale Image Recognition", arXiv:1409.1556v6, Apr. 10, 2015, 14 pages.

Vedantam, R. et al., "CIDEr: Consensus-based Image Description Evaluation", arXiv:1411.5726v2, Jun. 3, 2015, 17 pages.

Vinyals, O. et al., "Show and Tell: A Neural Image Caption Generator", arXiv:1411.4555v2, Apr. 20, 2015, 9 pages.

Xu, K. et al., "Show, Attend and Tell: Neural Image Caption Generation with Visual Attention", arXiv:1502.03044v1, Feb. 10, 2015, 22 pages.

You, Q. et al., "Image Captioning with Semantic Attention", arXiv:1603.03925v1, Mar. 12, 2016, 10 pages.

Zaremba W. et al., "Recurrent Neural Network Regularization", arXiv:1409.2329v5, Feb. 19, 2015, 8 pages.

"Facebook's Latest Feature Will Help Blind People in a Big Way", retrieved from the Internet: http://time.com/4281868/facebook-feature-photo-descriptions-visually-impaired/, [copy retrieved Oct. 24, 2019], 2 pages.

International Search Report for International Patent Application PCT/CN2017/077280, dated Dec. 27, 2017, 5 pages.

Written Opinion of the International Searching Authority for International Patent Application PCT/CN2017/077280, dated Dec. 27, 2017, 4 pages.

* cited by examiner

Image 202

Caption 204 → Bridge across a river

Image 206

Caption 208 → A dog resting on a snow bank in front of a railing

TOPIC-GUIDED MODEL FOR IMAGE CAPTIONING SYSTEM

BACKGROUND

Image captioning systems attempt to generate descriptions (e.g., captions) for an image, based on the content of that image. Existing image captioning systems typically employ computer vision techniques to obtain details about the image and natural language processing techniques to describe the image content. These systems, however, do not always provide satisfactory results, particularly when language ambiguities arise with respect to the image content, or when relatively complex images include many components and characteristics that associate with different words.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts.

Figure 1:
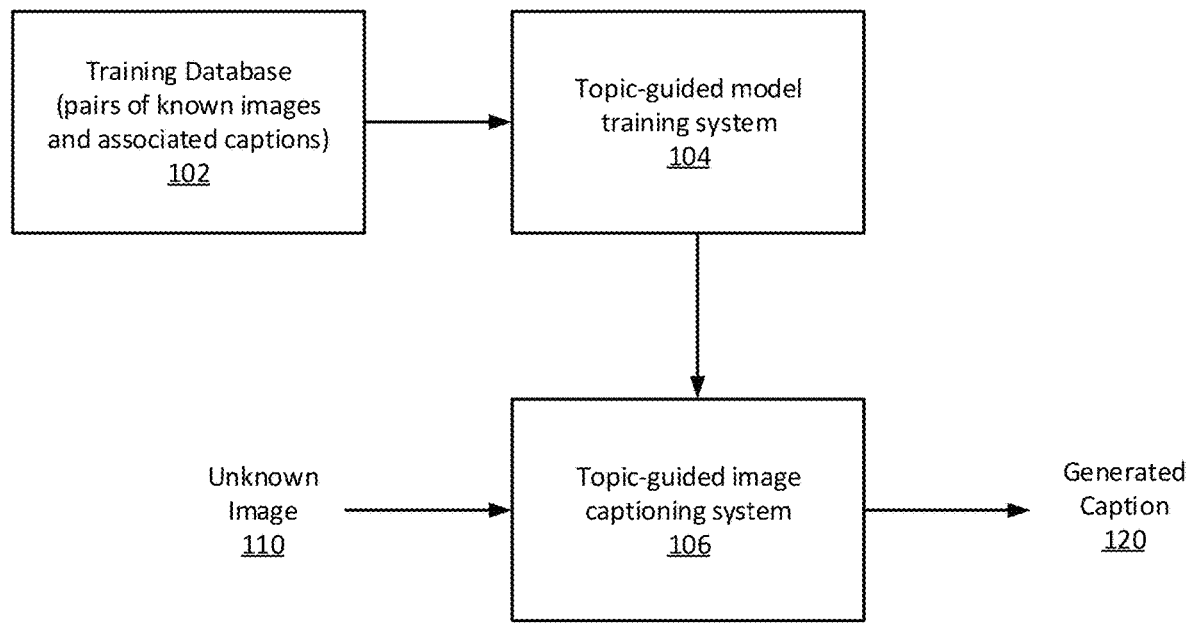
FIG. 1 is a top-level block diagram of an image captioning system, configured in accordance with certain embodiments of the present disclosure.

Although the following Detailed Description will proceed with reference being made to illustrative embodiments, many alternatives, modifications, and variations thereof will be apparent in light of this disclosure.

DETAILED DESCRIPTION

Generally, this disclosure provides techniques for training and operation of a topic-guided image captioning system. The topic-guided captioning system identifies and exploits connections between visual features and language features during system, training using training images and associated training captions. Estimated topics are calculated from the training images and feature vectors are calculated from the training captions, which are then combined in a multimodal compact bilinear (MCB) pooling to train a recurrent neural network (RNN), as will be described in greater detail below. The combination of image topic-related guidance along with language features (e.g., the caption words) allows for improved caption generation that includes not only objects categories, but also object attributes such as shapes, colors, and relationships between objects and activities within the image. Thus, the different semantic meanings of words can be considered when captioning a given image, thereby allowing for disambiguation of complex imagery.

The disclosed techniques can be implemented, for example, in a computing system or a software product executable or otherwise controllable by such systems, although other embodiments will be apparent. The system or product is configured to perform topic-guided captioning on an image. In accordance with an embodiment, a methodology to implement these techniques includes generating image feature vectors, for an image to be captioned, based on application of a convolutional neural network (CNN) to the image. The method further includes generating the caption based on application of a recurrent neural network (RNN) to the image feature vectors. In some example embodiments, the RNN is configured as a "long short-term memory" (LSTM) RNN, as will be explained in greater detail below. Other natural language processing techniques can be used as well, as will be appreciated in light of this disclosure. The method further includes training the LSTM RNN with training images and associated training captions. The training is based on a combination of: feature vectors calculated from the training image; feature vectors calculated from the associated training caption; and an MCB pooling of the training caption feature vectors and an estimated topic of the training image. The estimated topic is generated by an application of the CNN to the training image.

As will be appreciated, the techniques described herein may allow for improved image captioning, compared to existing methods that fail to exploit the connections between visual features and language features. The disclosed techniques can be implemented on a broad range of platforms including laptops, tablets, smart phones, workstations, and imaging devices. These techniques may further be implemented in hardware or software or a combination thereof.

FIG. 1 is a top-level block diagram of an image captioning system 100, configured in accordance with certain embodiments of the present disclosure. The image captioning system 100 is shown to include a topic-guided model training system 104, a topic-guided image captioning system 106, and a training database 102. The training database 102 is configured to store training images of known content along with predetermined training captions. Each training caption is associated with a training image. For example, one training image may depict a woman playing tennis, and the associated training caption would be "a, woman is playing tennis on a tennis court." In some embodiments, other suitable mechanisms may be employed to provide pairs of training images and training captions.

The topic-guided model training system 104 is configured to employ the training images and associated captions from the training database to train the topic-guided image captioning system 106, as will be explained in greater detail below. The resulting trained topic-guided image captioning system 106 is then configured to process images 110 (e.g., of unknown content), and generate captions 120 for those images, as will also be explained below.

Figure 2:
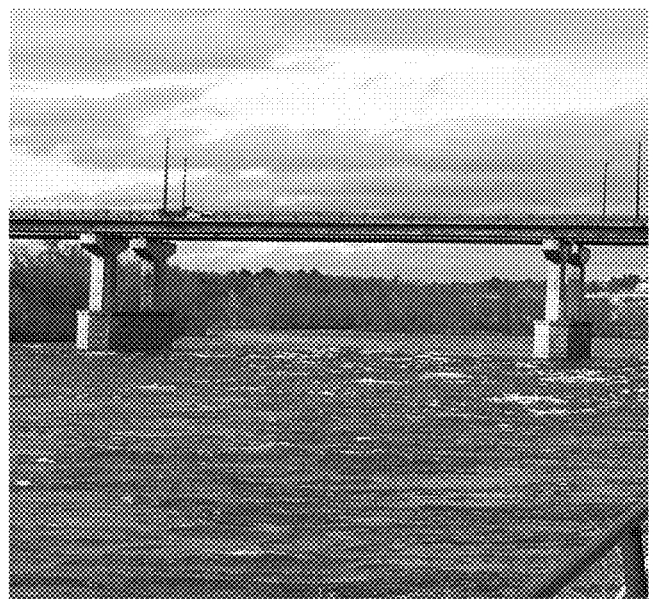
FIG. 2 illustrates examples of images and associated captions, in accordance with certain embodiments of the present disclosure.
Figure 2:

FIG. 2 illustrates examples of images and associated captions, in accordance with certain embodiments of the present disclosure. For example, image 202 may be associated with a caption 204 of "bridge across a river." As another example, image 206 may be associated with a caption 208 of "a dog resting on a snow bank in front of a railing." These example images and captions can serve to illustrate training image/caption pairings from database 102, or unknown images 110 and generated captions 120. It will be appreciated, of course, that any image can be used and that such images may include any combination of people, objects, activities, and backgrounds, etc.

Figure 3:
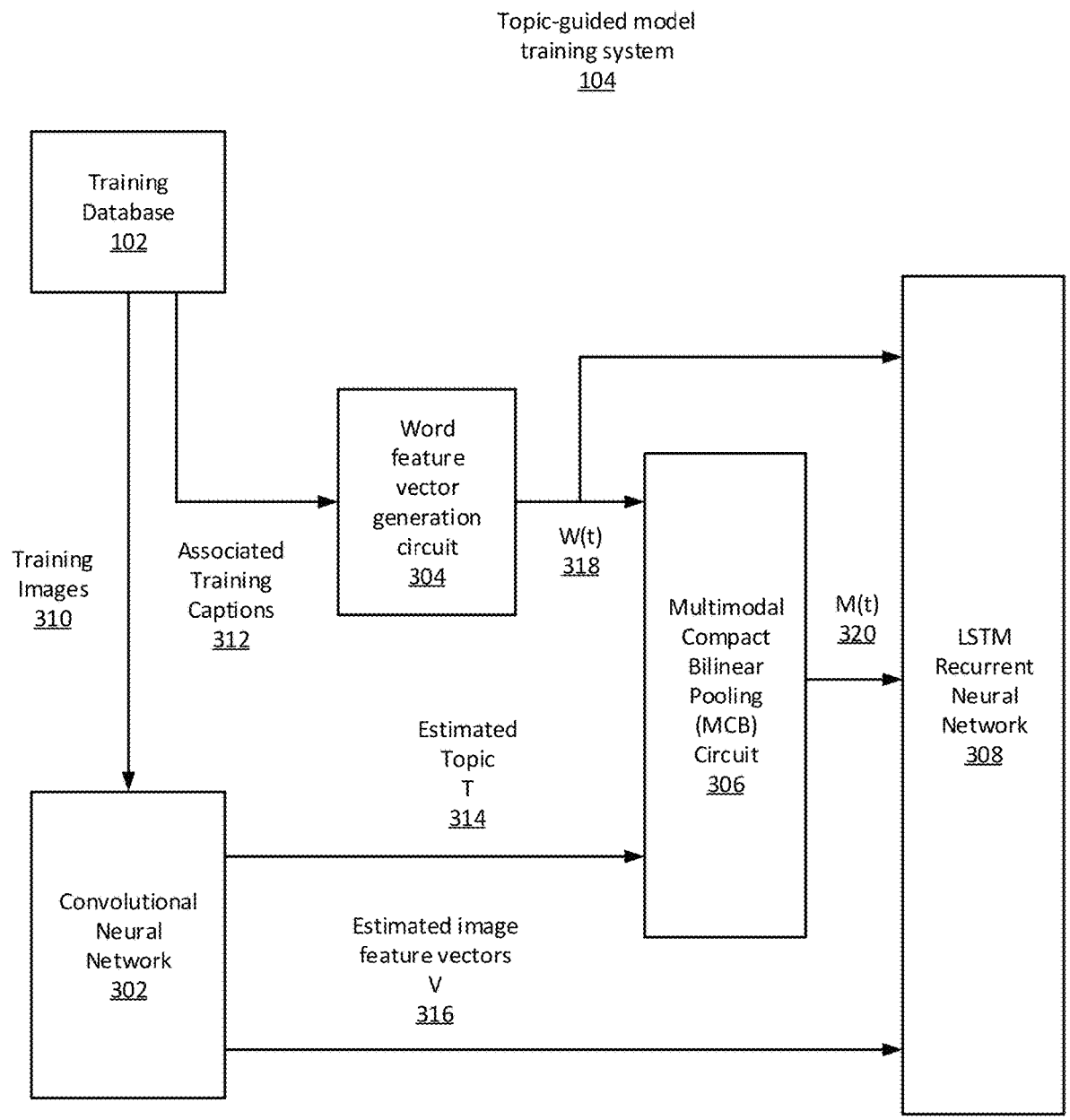
FIG. 3 is a block diagram of a topic-guided model training system, configured in accordance with certain embodiments of the present disclosure.

FIG. 3 is a block diagram of a topic-guided model training system 104, configured in accordance with certain embodiments of the present disclosure. The topic-guided model training system 104 is shown to include a convolutional neural network (CNN) 302, a word feature vector generation circuit 304, a multimodal compact bilinear pooling (MCB) circuit 306, and a long short-term memory (LSTM) recurrent neural network (RNN) 308.

The convolutional neural network (CNN) 302 is configured to generate an estimated topic T 314, associated with each training image 310. The CNN 302 is further configured to generate an estimated image feature vector V 316, associated with the training image. The topic T provides a relatively higher level abstraction of the image (e.g., semantic information) compared to the visual features of V, and helps to reduce noise and overfitting problems that may result from reliance on visual features alone. In some embodiments, the CNN may be initialized based on a pretrained Visual Geometry Group (VGG) neural network model, or based on other known techniques in light of the present disclosure.

The word feature vector generation circuit 304 is configured to generate word feature vectors W(t), 318 based on the training caption 312 associated with the training image 310. In some embodiments, a training caption that comprises N words may generate N word feature vectors W(t), where t=0, 1 . . . N-1. Word feature vectors may be generated using any known techniques, in light of the present disclosure.

The multimodal compact bilinear pooling (MCB) circuit 306 is configured to combine the estimated topic T 314 with the word feature vectors W(t) 318. In some embodiments, the MCB circuit 306 further comprises a Fourier transform circuit and an inverse Fourier transform circuit. The Fourier transform circuit is configured to perform a Fourier transform on the estimated topic T and a Fourier transform on the word feature vectors W(t). The inverse Fourier transform circuit is configured to perform an inverse Fourier transform on the multiplicative product of the Fourier transform of the estimated topic and the Fourier transform of the word feature vectors, as illustrated, for example, by the equation:

$$M(t)=FFT^{-1}(FFT(T) \cdot FFT(W(t)))$$

where M(t) 320 is the resulting MCB combination vector of topic T and feature vector of word t. This multiplication in the frequency domain, which is equivalent to convolution in the time domain, provides a joint representation of image topics and language words that is superior to a simpler element-wise addition or multiplication operation. The combination vector M(t), thus provides an improved representation of the potentially diverse meanings of a word when used to describe different images, compared to traditional techniques that represent each word as a single feature vector.

The long short-term memory (LSTM) recurrent neural network (RNN) 308 is configured to generate image captions, once operational (e.g., after training). The LSTM RNN 308 is trained based on the word feature vectors W(t) 318, the estimated image feature vector V 316, and the MCB pooling combination of the estimated topic and the word feature vectors M(t) 320, as will be explained in greater detail below in connection with FIG. 4.

Figure 4:
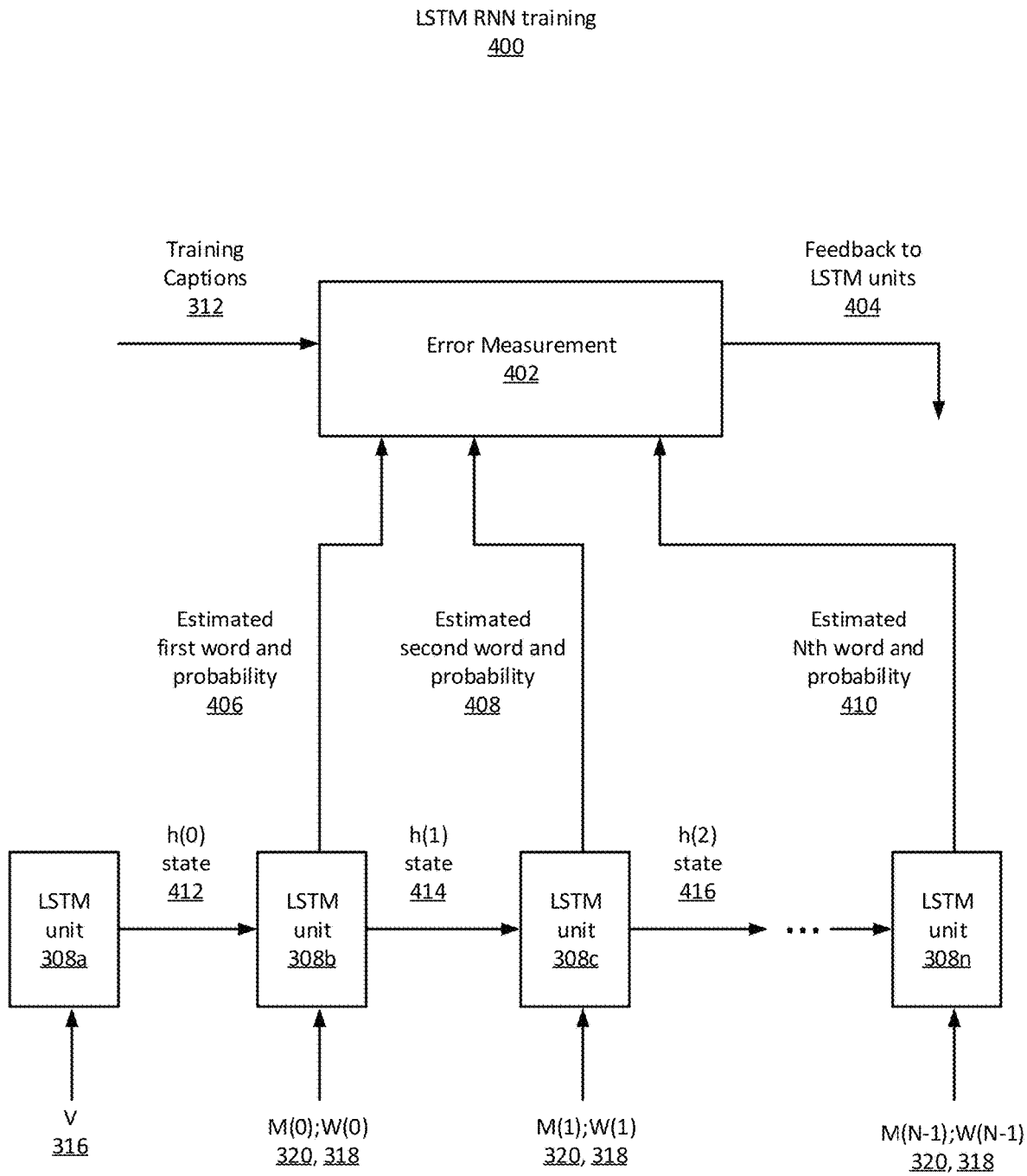
FIG. 4 is a flow diagram for training of a recurrent neural network (RNN), in accordance with certain embodiments of the present disclosure.

FIG. 4 is a flow diagram 400 for training of the LSTM RNN 308, in accordance with certain embodiments of the present disclosure. The LSTM RNN 308 is shown to include a number of LSTM neural network units or nodes 308a, 308b, 308c . . . 308n. The first LSTM unit 308a is configured to process the estimated image feature vector V 316 and generate initial state information h(0) 412, to be propagated to the second LSTM unit 308b. The second LSTM unit 308b is configured to process a concatenation of M(0) 320 and W(0) 318 in conjunction with the state information h(0) 412 to generate an estimated first word 406 (and associated probability) of the caption for the training image. This process continues with each subsequent LSTM unit 308c, . . . 308n, applied to each following pair of M(t) and W(t), along with propagated state information h(t), to generate estimates and probabilities 408, 410 for subsequent words of the caption. The state information h(t) serves as a memory of previous words of the caption sentence. For example, if the caption is "A woman is playing baseball," it is preferable to generate "playing" based on "a woman is" rather than just the word "is" in isolation.

An error measurement 402 is performed between the estimated caption words 406, 408, 410 and the actual words of the training caption 312 (e.g., truth data). The error measurement is fed back 404 to the LSTM units for training adaptation using known techniques, in light of the present disclosure. The training process 400 is repeated for each pair of training image and training caption from the training database 102.

Figure 5:
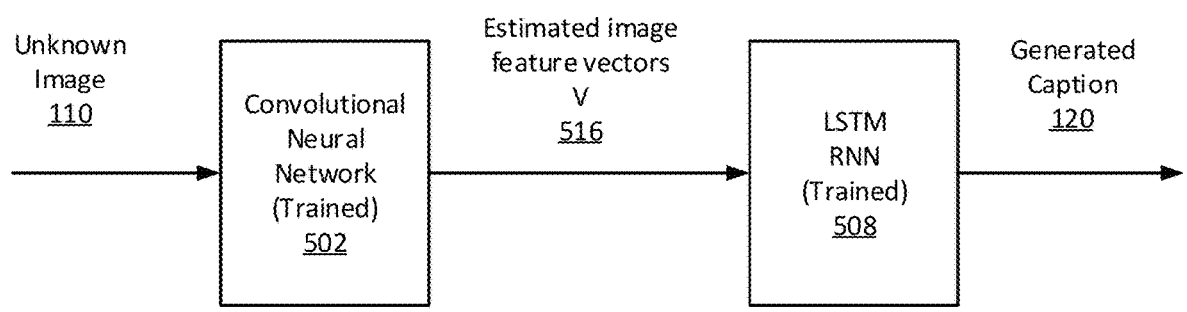
FIG. 5 is a block diagram of a topic-guided image captioning system, configured in accordance with certain embodiments of the present disclosure.

FIG. 5 is a block diagram of a topic-guided image captioning system 106, configured in accordance with certain embodiments of the present disclosure. The topic-guided image captioning system 106 is shown to include a trained convolutional neural network (CNN) 502 and a trained LSTM RNN 508. In some embodiments, the training has been accomplished as previously described in connection with FIGS. 3 and 4.

The trained CNN 502 is configured to generate estimated image feature vectors V 516, for an image to be captioned 110, based on application of a convolutional neural network to the image, using known techniques in light of the present disclosure.

The trained LSTM RNN 508 configured to generate an estimated caption 120, based on application of a recurrent neural network to the estimated image feature vectors V 516, as described below in connection with FIG. 6.

In some embodiments, the generated caption 120 may be provided to one or more applications or systems, such as, for example, a photo-captioning application of a social media platform or service, a human-robot interaction application, a content-based image retrieval application, a gaming application, an entertainment application, or a system configured to aid the visually impaired.

Figure 6:
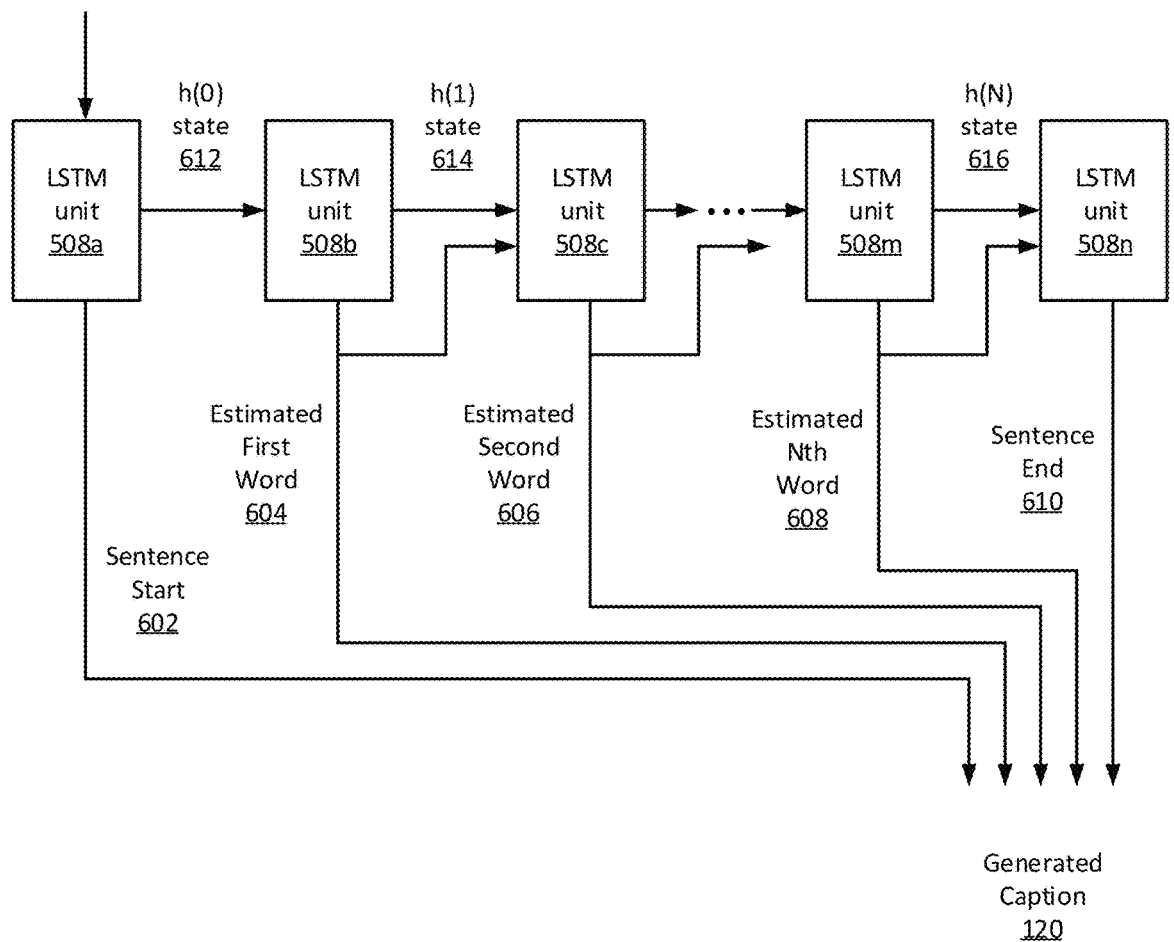
FIG. 6 is a flow diagram of the operation of an RNN system, in accordance with certain embodiments of the present disclosure.

FIG. 6 is a flow diagram 600 of the operation of an LSTM RNN system, in accordance with certain embodiments of the present disclosure. The trained LSTM RNN 508 is shown to include a number of LSTM neural network units or nodes 508a, 508b, 508c . . . 508m, 508n, which may operate based on known techniques in light of the present disclosure. The first LSTM unit 508a is configured to process the estimated image feature vector V 516 and generate initial state information h(0) 612, to be propagated to the second LSTM unit 508b. The second LSTM unit 508b is configured to process the state information h(0) 612 to generate an estimated first word 604 of the caption for the unknown image 110. This process continues with each subsequent LSTM unit 508c, . . . 508n, applied to generate additional words 606, . . . 608, for the caption based on propagated state information h(t) 614, . . . 616 until the end of the caption sentence 610. The estimated words 604, . . . 608, are combined to form the generated caption estimate 120.

Methodology

Figure 7:
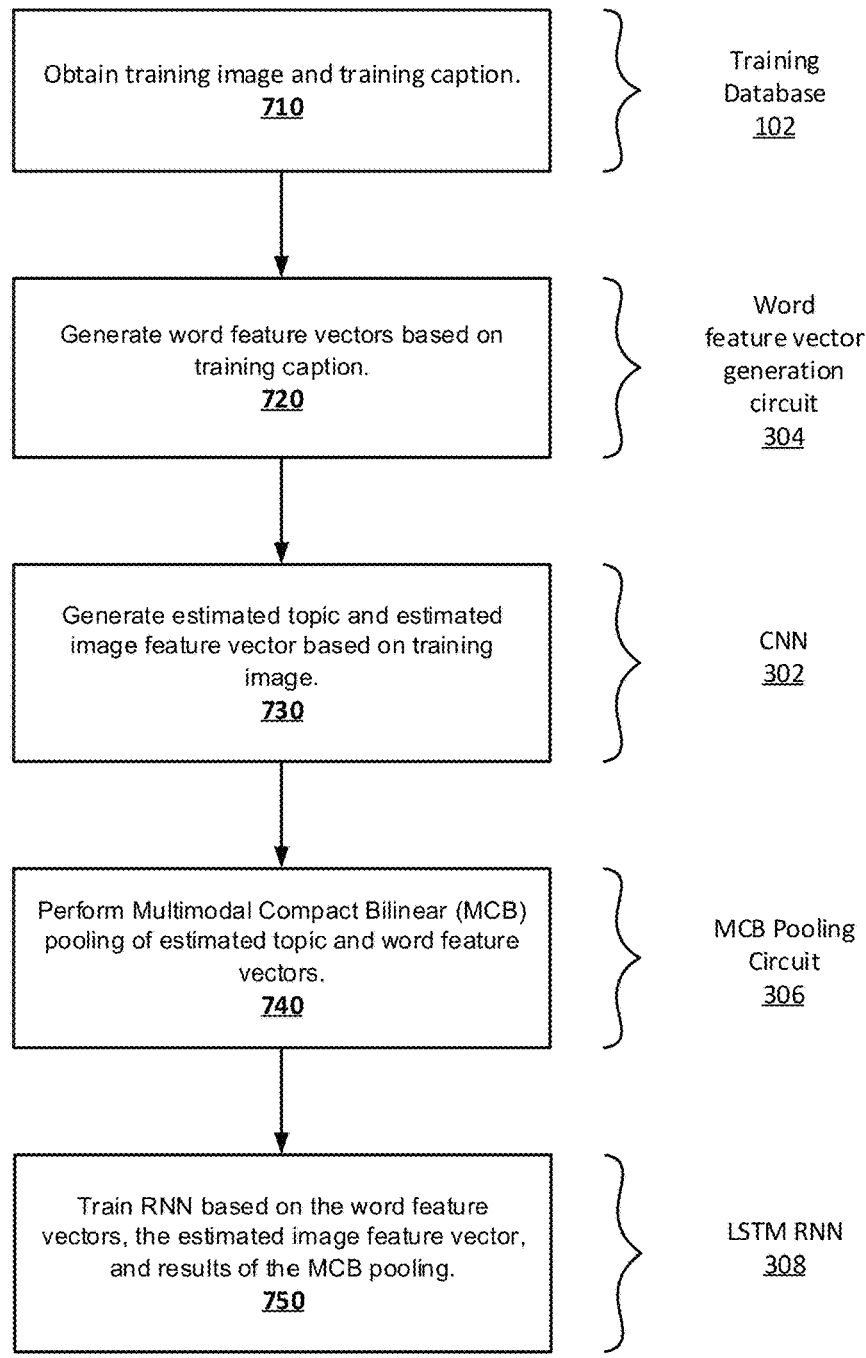
FIG. 7 is a flowchart illustrating a methodology for training of a topic-guided image captioning system, in accordance with certain embodiments of the present disclosure.
Figure 8:
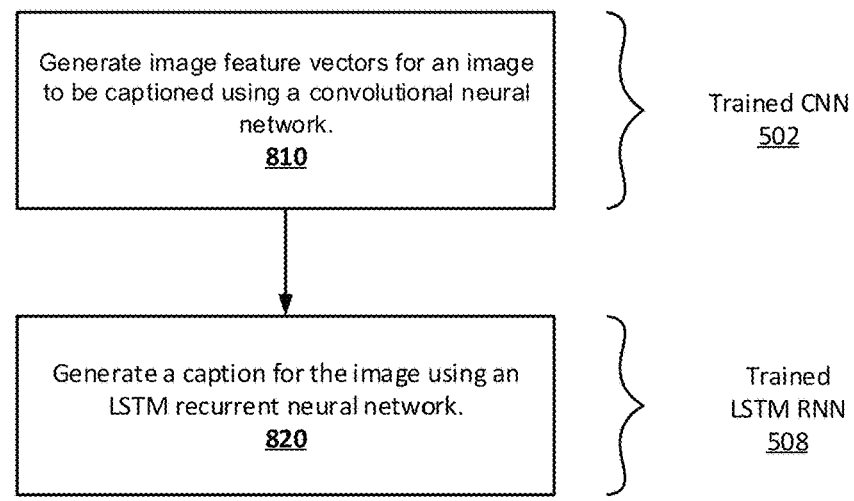
FIG. 8 is a flowchart illustrating a methodology for topic-guided image captioning, in accordance with certain embodiments of the present disclosure.

FIGS. 7 and 8 are flowcharts illustrating example methods for training 700 and operation of 800, a topic-guided image captioning system, in accordance with certain embodiments of the present disclosure. As can be seen, the example methods include a number of phases and sub-processes, the sequence of which may vary from one embodiment to another. However, when considered in the aggregate, these phases and sub-processes form a process for image captioning in accordance with certain of the embodiments disclosed herein. These embodiments can be implemented, for example using the system architecture illustrated in FIGS. 3-6 as described above. However other system architectures can be used in other embodiments, as will be apparent in light of this disclosure. To this end, the correlation of the various functions shown in FIGS. 7 and 8 to the specific components illustrated in the other figures is not intended to imply any structural and/for use limitations. Rather, other embodiments may include, for example, varying degrees of integration wherein multiple functionalities are effectively performed by one system. For example, in an alternative embodiment a single module can be used to perform all of the functions of methods 700 and 800. Thus, other embodiments may have fewer or more modules and/or sub-modules depending on the granularity of implementation. In still other embodiments, the methodology depicted can be implemented as a computer program product including one or more non-transitory machine readable mediums that when executed by one or more processors cause the methodology to be carried out. Numerous variations and alternative configurations will be apparent in light of this disclosure.

As illustrated in FIG. 7, in an embodiment, method 700 for training of a topic-guided image captioning system commences by obtaining, at operation 710, one or more training images and associated training captions for each image. In some embodiments, the training images and associated training captions may be obtained from a training database or other suitable source.

Next, at operation 720, word feature vectors are generated based on the training caption.

At operation 730, a convolutional neural network (CNN) is applied to the training image, to generate an estimated topic associated with the training image, and to generate an estimated image feature vector associated with the training image.

At operation 740, a multimodal compact bilinear (MCB) pooling is performed on the estimated topic and the word feature vectors. In some embodiments, the MCB pooling includes performing a Fourier transform on the estimated topic and on the word feature vectors; and then performing an inverse Fourier transform on the multiplicative product of the Fourier transform of the estimated topic and the Fourier transform of the word feature vectors, to generate the pooling results.

At operation 750, a recurrent neural network (RNN) is trained based on the word feature vectors, the estimated image feature vector, and the results of the MCB pooling. In some embodiments, the RNN is configured as a long short-term memory (LSTM) RNN.

As illustrated in FIG. 8, in an embodiment, method 800 for topic-guided image captioning commences by generating, at operation 810, image feature vectors for an image to be captioned. In some embodiments, the image feature vectors are generated by application of a convolutional neural network (CNN) to the image.

Next, at operation 820, a caption is generated for the image, based on application of a recurrent neural network (RNN) to the image feature vectors. In some embodiments, the RNN is configured as a long short-term memory (LSTM) RNN, and the RNN is trained as described previously in connection with the description of FIG. 7.

Of course, in some embodiments, additional operations may be performed, as previously described in connection with the system. For example, the generated caption may be provided to one or more applications or systems, such as, for example, a photo-captioning application of a social media platform or service, a human-robot interaction application, a content-based image retrieval application, a gaming application, an entertainment application, or a system configured to aid the visually impaired.

Example System

Figure 9:
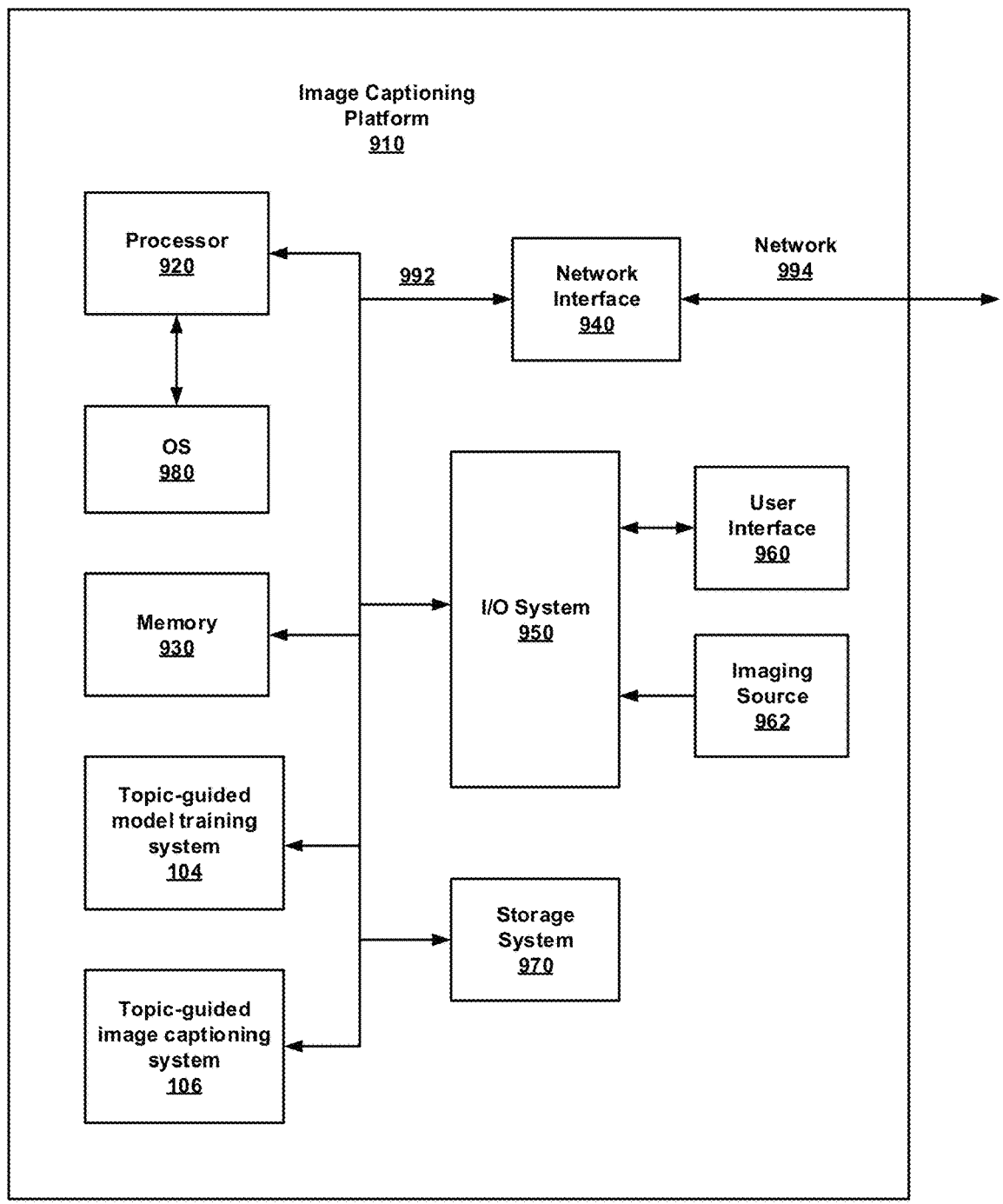
FIG. 9 is a block diagram schematically illustrating a platform to perform topic-guided image captioning, configured in accordance with certain embodiments of the present disclosure.

FIG. 9 illustrates an example system 900 to perform topic-guided image captioning, configured in accordance with certain embodiments of the present disclosure. In some embodiments, system 900 comprises an image captioning platform 910 which may host, or otherwise be incorporated into a personal computer, workstation, server system, laptop computer, ultra-laptop computer, tablet, touchpad, portable computer, handheld computer, palmtop computer, personal digital assistant (PDA), cellular telephone, combination cellular telephone and PDA, smart device (for example, smartphone or smart tablet), mobile internet device (MID), messaging device, data communication device, imaging device, and so forth. Any combination of different devices may be used in certain embodiments.

In some embodiments, platform 910 may comprise any combination of a processor 920, a memory 930, topic-guided image captioning system 106, topic-guided model training system 104, a network interface 940, an input/output (I/O) system 950, a user interface 960, an imaging source 962, and a storage system 970. As can be further seen, a bus and/or interconnect 992 is also provided to allow for communication between the various components listed above and/or other components not shown. Platform 910 can be coupled to a network 994 through network interface 940 to allow for communications with other computing devices, platforms, or resources. Other componentry and functionality not reflected in the block diagram of FIG. 9 will be apparent in light of this disclosure, and it will be appreciated that other embodiments are not limited to any particular hardware configuration.

Processor 920 can be any suitable processor, and may include one or more coprocessors or controllers, such as an audio processor or a graphics processing unit to assist in control and processing operations associated with system 900. In some embodiments, the processor 920 may be implemented as any number of processor cores. The processor (or processor cores) may be any type of processor, such as, for example, a micro-processor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. Processor 920 may be implemented as a complex instruction set computer (CISC) or a reduced instruction set computer (RISC) processor. In some embodiments, processor 920 may be configured as an x86 instruction set compatible processor.

Memory 930 can be implemented using any suitable type of digital storage including, for example, flash memory and/or random access memory (RAM). In some embodiments, the memory 930 may include various layers of memory hierarchy and/or memory caches as are known to those of skill in the art. Memory 930 may be implemented as a volatile memory device such as, but not limited to, a RAM, dynamic RAM (DRAM), or static RAM (SRAM) device. Storage system 970 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 970 may comprise technology to increase the storage performance enhanced protection for valuable digital media when multiple hard drives are included.

Processor 920 may be configured to execute an Operating System (OS) 980 which may comprise any suitable operating system, such as Google Android (Google Inc., Mountain View, Calif.), Microsoft Windows (Microsoft Corp., Redmond, Wash.), Apple OS X (Apple Inc., Cupertino, Calif.), Linux, or a real-time operating system (RTOS). As will be appreciated in light of this disclosure, the techniques provided herein can be implemented without regard to the particular operating system provided in conjunction with system 900, and therefore may also be implemented using any suitable existing or subsequently-developed platform.

Network interface circuit 940 can be any appropriate network chip or chipset which allows for wired and/or wireless connection between other components of computer system 900 and/or network 994, thereby enabling system 900 to communicate with other local and/or remote computing systems, servers, cloud-based servers, and/or other resources. Wired communication may conform to existing (or yet to be developed) standards, such as, for example, Ethernet. Wireless communication may conform to existing (or yet to be developed) standards, such as, for example, cellular communications including LTE (Long Term Evolution), Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 950 may be configured to interface between various I/O devices and other components of computer system 900. I/O devices may include, but not be limited to, user interface 960, and an imaging source 962. User interface 960 may include devices (not shown) such as a display element, touchpad, keyboard, mouse, microphone, and speaker, etc. Imaging source 962 may be a camera, a scanner, a database of images, or any other suitable source. I/O system 950 may include a graphics subsystem configured to perform processing of images for rendering on a display element. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 920 or any chipset of platform 910.

It will be appreciated that in some embodiments, the various components of the system 900 may be combined or integrated in a system-on-a-chip (SoC) architecture. In some embodiments, the components may be hardware components, firmware components, software components or any suitable combination of hardware, firmware or software.

Topic-guided image captioning system 106 is configured to automatically generate captions for images, based on application of a convolutional neural network and a recurrent neural network (configured as a long short-term memory RNN), as described previously. Topic guided model training system 104 is configured to train the image captioning system 106 based on a combination of feature vectors of training images, feature vectors of associated training captions, and a multimodal compact bilinear pooling of the training caption feature vectors and an estimated topic of the training image, as described previously. Systems 104 and 106 may include any or all of the circuits/components illustrated in FIGS. 3-6, as described above. These components can be implemented or otherwise used in conjunction with a variety of suitable software and/or hardware that is coupled to or that otherwise forms a part of platform 910. These components can additionally or alternatively be implemented or otherwise used in conjunction with user I/O devices that are capable of providing information to, and receiving information and commands from, a user.

In some embodiments, these circuits may be installed local to system 900, as shown in the example embodiment of FIG. 9. Alternatively, system 900 can be implemented in a client-server arrangement wherein at least some functionality associated with these circuits is provided to system 900 using an applet, such as a JavaScript applet, or other downloadable module. Such a remotely accessible module or sub-module can be provisioned in real-time, in response to a request from a client computing system for access to a given server having resources that are of interest to the user of the client computing system. In such embodiments, the server can be local to network 994 or remotely coupled to network 994 by one or more other networks and/or communication channels. In some cases, access to resources on a given network or computing system may require credentials such as usernames, passwords, and/or compliance with any other suitable security mechanism.

In various embodiments, system 900 may be implemented as a wireless system, a wired system, or a combination of both. When implemented as a wireless system, system 900 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, system 900 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both.

Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The team "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the image captioning methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 994. In other embodiments, the functionalities disclosed herein can be incorporated into other software applications, such as image perception systems, robotics, and virtual reality applications. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus, in other embodiments system 900 may comprise additional, fewer, or alternative subcomponents as compared to those included in the example embodiment of FIG. 9.

The aforementioned non-transitory computer readable medium may be any suitable medium for storing digital information, such as a hard drive, a server, a flash memory, and/or random access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CR-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smart phones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

FURTHER EXAMPLE EMBODIMENTS

The following examples pertain to further embodiments, from which numerous permutations and configurations will be apparent.

Example 1 is a processor-implemented method for training an image captioning system. The method comprises: obtaining, by a processor-based system, a training image and a training caption, the training caption associated with the training image; generating, by the processor-based system, word feature vectors based on the training caption; applying, by the processor-based system, a convolutional neural network (CNN) to the training image, to generate an estimated topic associated with the training image, and to generate an estimated image feature vector associated with the training image; performing, by the processor-based system, a multimodal compact bilinear (MCB) pooling of the estimated topic and the word feature vectors; and training, by the processor-based system, a recurrent neural network (RNN) based on the word feature vectors, the estimated image feature vector, and results of the MCB pooling.

Example 2 includes the subject matter of Example 1, wherein the RNN is configured as a long short-term memory (LSTM) RNN.

Example 3 includes the subject matter of Examples 1 or 2, wherein the MCB pooling further comprises: performing a Fourier transform on the estimated topic; performing a Fourier transform on the word feature vectors; and performing an inverse Fourier transform on the multiplicative product of the Fourier transform of the estimated topic and the Fourier transform of the word feature vectors.

Example 4 includes the subject matter of any of Examples 1-3, further comprising initializing the CNN based on a pretrained Visual Geometry Group (VGG) neural network model.

Example 5 includes the subject matter of any of Examples 1-4, wherein the training image and the associated training caption are obtained from a training database.

Example 6 includes the subject matter of any of Examples 1-5, wherein the image captioning system is trained to generate a caption to be provided to at least one of a photo-captioning application of a social media platform or service, a human-robot interaction application, a content-based image retrieval application, a gaming application, an entertainment application, and a system configured to aid visually impaired people.

Example 7 includes the subject matter of any of Examples 1-6, further comprising: receiving an input image; and generating a caption for the input image, using the RNN.

Example 8 is a system for training an image captioning system. The system comprises: a word feature vector generation circuit to generate word feature vectors based on a training caption, the training caption associated with a training image; a convolutional neural network (CNN) to generate an estimated topic associated with the training image, and further to generate an estimated image feature vector associated with the training image; a multimodal compact bilinear (MCB) pooling circuit to combine the estimated topic and the word feature vectors; and a recurrent neural network (RNN) to generate image captions, wherein the RNN is trained on the word feature vectors, the estimated image feature vector, and the combination resulting from the MCB pooling.

Example 9 includes the subject matter of Example 8, wherein the RNN is configured as a long short-term memory (LSTM) RNN.

Example 10 includes the subject matter of Examples 8 or 9, wherein the MCB pooling circuit further comprises: a Fourier transform circuit to perform a Fourier transform on the estimated topic and the word feature vectors; and an inverse Fourier transform circuit to perform an inverse Fourier transform on the multiplicative product of the Fourier transform of the estimated topic and the Fourier transform of the word feature vectors.

Example 11 includes the subject matter of any of Examples 8-10, wherein the CNN is initialized based on a pretrained Visual Geometry Group (VGG) neural network model.

Example 12 includes the subject matter of any of Examples 8-11, further comprising a training database to provide the training image and the associated training caption.

Example 13 includes the subject matter of any of Examples 8-12, wherein the image captioning system is trained to generate a caption to be provided to at least one of a photo-captioning application of a social media platform or service, a human-robot interaction application, a content-based image retrieval application, a gaming application, an entertainment application, and a system configured to aid visually impaired people.

Example 14 is at least one non-transitory computer readable storage medium having instructions encoded thereon that, when executed by one or more processors, result in the following operations for image captioning. The operations comprise: obtaining a training image and a training caption, the training caption associated with the training image; generating word feature vectors based on the training caption; applying a convolutional neural network (CNN) to the training image, to generate an estimated topic associated with the training image, and to generate an estimated image feature vector associated with the training image; performing a multimodal compact bilinear (MCB) pooling of the estimated topic and the word feature vectors; and training a recurrent neural network (RNN) based on the word feature vectors, the estimated image feature vector, and results of the MCB pooling.

Example 15 includes the subject matter of Example 14, wherein the RNN is configured as a long short-term memory (LSTM) RNN.

Example 16 includes the subject matter of Examples 14 or 15, wherein the MCB pooling further comprises the operations: performing a Fourier transform on the estimated topic; performing a Fourier transform on the word feature vectors; and performing an inverse Fourier transform on the multiplicative product of the Fourier transform of the estimated topic and the Fourier transform of the word feature vectors.

Example 17 includes the subject matter of any of Examples 14-16, further comprising the operations of initializing the CNN based on a pretrained Visual Geometry Group (VGG) neural network model.

Example 18 includes the subject matter of any of Examples 14-17, wherein the training image and the associated training caption are obtained from a training database.

Example 19 includes the subject matter of any of Examples 14-18, wherein the image captioning system is trained to generate a caption to be provided to at least one of a photo captioning application of a social media platform or service, a human-robot interaction application, a content-based image retrieval application, a gaming application, an entertainment application, and a system configured to aid visually impaired people.

Example 20 is a processor-implemented method for image captioning. The method comprises: generating, by a processor-based system, image feature vectors for an image to be captioned, based on application of a convolutional neural network (CNN) to the image; and generating, by the processor-based system, the caption, based on application of a recurrent neural network (RNN) to the image feature vectors, wherein the RNN is trained on a combination of: feature vectors of a training image; feature vectors of a training caption, the training caption associated with the training image; and a multimodal compact bilinear (MCB) pooling of the training caption feature vectors and an estimated topic of the training image feature vectors.

Example 21 includes the subject matter of Example 20, wherein the RNN is configured as a long short-term memory (LSTM) RNN.

Example 22 includes the subject matter of Examples 20 or 21, wherein the training image feature vectors and the estimated topic of the training image feature vectors are generated based on application of the CNN to the training image.

Example 23 includes the subject matter of any of Examples 20-22, wherein the MCB pooling further comprises: performing a Fourier transform on the estimated topic of the training image feature vectors; performing a Fourier transform on the training caption feature vectors; and performing an inverse Fourier transform on the multiplicative product of the Fourier transform of the estimated topic of the training image feature vectors and the Fourier transform of the training caption feature vectors.

Example 24 includes the subject matter of any of Examples 20-23, further comprising initializing the CNN based on a pretrained Visual Geometry Group (VGG) neural network model.

Example 25 includes the subject matter of any of Examples 20-24, further comprising providing the generated caption to at least one of a photo-captioning application of a social media platform or service, a human-robot interaction application, a content-based image retrieval application, a gaming application, an entertainment application, and a system configured to aid visually impaired people.

Example 26 is a system for training an image captioning system. The system comprises: means for obtaining a training image and a training caption, the training caption associated with the training image; means for generating word feature vectors based on the training caption; means for applying a convolutional neural network (CNN) to the training image, to generate an estimated topic associated with the training image, and to generate an estimated image feature vector associated with the training image; means for performing a multimodal compact bilinear (MCB) pooling of the estimated topic and the word feature vectors; and means for training a recurrent neural network (RNN) based on the word feature vectors, the estimated image feature vector, and results of the MCB pooling.

Example 27 includes the subject matter of Example 26, wherein the RNN is configured as a long short-term memory (LSTM) RNN.

Example 28 includes the subject matter of Examples 26 or 27, wherein the MCB pooling further comprises: means for performing a Fourier transform on the estimated topic; means for performing a Fourier transform on the word feature vectors; and means for performing an inverse Fourier transform on the multiplicative product of the Fourier transform of the estimated topic and the Fourier transform of the word feature vectors.

Example 29 includes the subject matter of any of Examples 26-28, further comprising means for initializing the CNN based on a pretrained Visual Geometry Group (VGG) neural network model.

Example 30 includes the subject matter of any of Examples 26-29, wherein the training image and the associated training caption are obtained from a training database.

Example 31 includes the subject matter of any of Examples 26-30, wherein the image captioning system is trained to generate a caption to be provided to at least one of a photo-captioning application of a social media platform or service, a human-robot interaction application, a content-based image retrieval application, a gaming application, an entertainment application, and a system configured to aid visually impaired people.

Example 32 includes the subject matter of any of Examples 26-31, further comprising: means for receiving an input image; and means for generating a caption for the input image, using the RNN.

Example 33 is a system for image captioning. The system comprises: means for generating image feature vectors for an image to be captioned, based on application of a convolutional neural network (CNN) to the image; and means for generating the caption, based on application of a recurrent neural network (RNN) to the image feature vectors, wherein the RNN is trained on a combination of: feature vectors of a training image; feature vectors of a training caption, the training caption associated with the training image; and a multimodal compact bilinear (MCB) pooling of the training caption feature vectors and an estimated topic of the training image feature vectors.

Example 34 includes the subject matter of Example 33, wherein the RNN is configured as a long short-term memory (LSTM) RNN.

Example 35 includes the subject matter of Examples 33 or 34, wherein the training image feature vectors and the estimated topic of the training image feature vectors are generated based on application of the CNN to the training image.

Example 36 includes the subject matter of any of Examples 33-35, wherein the MCB pooling further comprises: means for performing a Fourier transform on the estimated topic of the training image feature vectors; means for performing a Fourier transform on the training caption feature vectors; and means for performing an inverse Fourier transform on the multiplicative product of the Fourier transform of the estimated topic of the training image feature vectors and the Fourier transform of the training caption feature vectors.

Example 37 includes the subject matter of any of Examples 33-36, further comprising means for initializing the CNN based on a pretrained Visual Geometry Group (VGG) neural network model.

Example 38 includes the subject matter of any of Examples 33-37, further comprising means for providing the generated caption to at least one of a photo-captioning application of a social media platform or service, a human-robot interaction application, a content-based image retrieval application, a gaming application, an entertainment application, and a system configured to aid visually impaired people.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A method for training an image captioning system, the method comprising:

obtaining, by executing instructions with at least one processor, a training image and a training caption, the training caption associated with the training image;

generating, by executing instructions with the at least one processor, word feature vectors based on the training caption;

applying, by executing instructions with the at least one processor, a convolutional neural network (CNN) to the training image, to generate an estimated topic associated with the training image, and to generate an estimated image feature vector associated with the training image;

performing, by executing instructions with the at least one processor, a multimodal compact bilinear (MCB) pooling of the estimated topic and the word feature vectors; and training, by executing instructions with the at least one processor, a recurrent neural network (RNN) based on the word feature vectors, the estimated image feature vector, and results of the MCB pooling.

2. The method of claim 1, wherein the RNN is a long short-term memory (LSTM) RNN.

3. A processor-implemented method for training an image captioning system, the method comprising:

obtaining, by a processor-based system a processor-based system, a training image and a training caption, the training caption associated with the training image;

generating, by the processor-based system, word feature vectors based on the training caption;

applying, by the processor-based system, a convolutional neural network (CNN) to the training image, to generate an estimated topic associated with the training image, and to generate an estimated image feature vector associated with the training image;

performing, by the processor-based system, a multimodal compact bilinear (MCB) pooling of the estimated topic and the word feature vectors; and training, by the processor-based system processor, a recurrent neural network (RNN) based on the word feature vectors, the estimated image feature vector, and results of the MCB pooling, wherein the MCB pooling further comprises:

performing a Fourier transform on the estimated topic;

performing a Fourier transform on the word feature vectors; and performing an inverse Fourier transform on the multiplicative product of the Fourier transform of the estimated topic and the Fourier transform of the word feature vectors.

4. The method of claim 1, further including initializing the CNN based on a pretrained Visual Geometry Group (VGG) neural network model.

5. The method of claim 1, wherein the training image and the associated training caption are obtained from a training database.

6. The method of claim 1, further including employing the image captioning system to generate a caption; and providing the caption to at least one of a photo-captioning application of a social media platform or service, a human-robot interaction application, a content-based image retrieval application, a gaming application, an entertainment application, and a system configured to aid visually impaired people.

7. The method of claim 1, further including:

receiving an input image; and generating a caption for the input image, using the RNN.

8. At least one non-transitory computer readable storage medium comprising instructions that, when executed, cause the one or more processors to:
- obtain a training image and a training caption, the training caption associated with the training image;
- generate word feature vectors based on the training caption;
- apply a convolutional neural network (CNN) to the training image, to generate an estimated topic associated with the training image, and to generate an estimated image feature vector associated with the training image;
- perform a multimodal compact bilinear (MCB) pooling of the estimated topic and the word feature vectors; and
- train a recurrent neural network (RNN) based on the word feature vectors, the estimated image feature vector, and results of the MCB pooling.

9. The computer readable storage medium of claim 8, wherein the RNN is a long short-term memory (LSTM) RNN.

10. At least one non-transitory computer readable storage medium comprising instructions that, when executed by one or more processors, result in the following operations for training an image captioning system, the operations comprising:
- obtaining a training image and a training caption, the training caption associated with the training image;
- generating word feature vectors based on the training caption;
- applying a convolutional neural network (CNN) to the training image, to generate an estimated topic associated with the training image, and to generate an estimated image feature vector associated with the training image;
- performing a multimodal compact bilinear (MCB) pooling of the estimated topic and the word feature vectors; and
- training a recurrent neural network (RNN) based on the word feature vectors, the estimated image feature vector, and results of the MCB pooling, wherein the MCB pooling further comprises the operations:
- perform a Fourier transform on the estimated topic;
- perform a Fourier transform on the word feature vectors; and
- perform an inverse Fourier transform on the multiplicative product of the Fourier transform of the estimated topic and the Fourier transform of the word feature vectors.

11. The computer readable storage medium of claim 8, wherein the instructions cause the one or more processors to initialize the CNN based on a pretrained Visual Geometry Group (VGG) neural network model.

12. The computer readable storage medium of claim 8, wherein instructions cause the one or more processors to obtain the training image and the associated training caption from a training database.

13. The computer readable storage medium of claim 8, wherein the instructions cause the one or more processors to train the image captioning system to generate a caption to be provided to at least one of a photo-captioning application of a social media platform or service, a human-robot interaction application, a content-based image retrieval application, a gaming application, an entertainment application, and a system configured to aid visually impaired people.

14. At least one non-transitory computer readable storage medium comprising instructions that, when executed by one or more processors, cause the one or more processors to:
- generate image feature vectors for an image to be captioned, based on application of a convolutional neural network (CNN) to the image; and
- generate the caption, based on application of a recurrent neural network (RNN) to the image feature vectors,
  - wherein the RNN is trained on a combination of: feature vectors of a training image; feature vectors of a training caption, the training caption associated with the training image; and a multimodal compact bilinear (MCB) pooling of the training caption feature vectors and an estimated topic of the training image feature vectors.

15. The computer readable storage of claim 14, wherein the RNN is a long short-term memory (LSTM) RNN.

16. The computer readable storage of claim 14, wherein the instructions cause the one or more processors to train image feature vectors and the estimated topic of the training image feature vectors are generated based on application of the CNN to the training image.

17. At least one non-transitory computer readable storage medium comprising instructions that, when executed by one or more processors, result in the following operations for image captioning, the operations comprising:
- generating, by a processor-based system, image feature vectors for an image to be captioned, based on application of a convolutional neural network (CNN) to the image; and
- generating, by the processor-based system, the caption, based on application of a recurrent neural network (RNN) to the image feature vectors,
  - wherein the RNN is trained on a combination of: feature vectors of a training image; feature vectors of a training caption, the training caption associated with the training image; and a multimodal compact bilinear (MCB) pooling of the training caption feature vectors and an estimated topic of the training image feature vectors, and
  - wherein the MCB pooling further comprises:
- performing a Fourier transform on the estimated topic of the training image feature vectors;
- performing a Fourier transform on the training caption feature vectors; and
- performing an inverse Fourier transform on the multiplicative product of the Fourier transform of the estimated topic of the training image feature vectors and the Fourier transform of the training caption feature vectors.

18. The computer readable storage of claim 14, wherein the instructions cause the one or more processors to initialize the CNN based on a pretrained Visual Geometry Group (VGG) neural network model.

19. The computer readable storage of claim 14, wherein the instructions cause the one or more processors to provide the generated caption to at least one of a photo-captioning application of a social media platform or service, a human-robot interaction application, a content-based image retrieval application, a gaming application, an entertainment application, and a system configured to aid visually impaired people.

20. The method of claim 1, wherein the performing of the MCB pooling of the estimated topic and the word feature vectors is performed in a frequency domain.

21. The method of claim 20, wherein the performance of the MCB pooling includes performing a Fourier transform on an estimated topic and a Fourier transform on word feature vectors.

22. An apparatus for training an image captioning system, the apparatus comprising:

a training database to store a training image and a training caption, the training caption associated with the training image;

a word feature vector generation circuit to generate word feature vectors based on the training caption;

a convolutional neural network (CNN) to generate an estimated topic associated with the training image, and to generate an estimated image feature vector associated with the training image;

a multimodal compact bilinear (MCB) pooling circuit to pool the estimated topic and the word feature vectors; and a recurrent neural network (RNN) to generate image captions based on the word feature vectors, the estimated image feature vector, and results of the MCB pooling.

* * * * *